(12) United States Patent
Prestenback et al.

(10) Patent No.: US 9,247,007 B2
(45) Date of Patent: Jan. 26, 2016

(54) SYSTEM AND METHOD FOR PROVIDING A PERIPHERAL CONTROL INTERFACE FOR EXTENDING MEDIA DEVICE FUNCTIONS

(75) Inventors: Kyle Prestenback, Burbank, CA (US); Evan Tahler, San Francisco, CA (US); Jeffrey R. Ashbrook, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1549 days.

(21) Appl. No.: 12/386,936

(22) Filed: Apr. 23, 2009

(65) Prior Publication Data

US 2010/0271654 A1    Oct. 28, 2010

(51) Int. Cl.
*H04L 29/08* (2006.01)
*H04L 12/28* (2006.01)

(52) U.S. Cl.
CPC .............. *H04L 67/16* (2013.01); *H04L 12/281* (2013.01)

(58) Field of Classification Search
USPC ................................................. 709/219, 227
See application file for complete search history.

(56) References Cited

U.S. PATENT DOCUMENTS

| | | | | |
|---|---|---|---|---|
| 5,999,945 | A * | 12/1999 | Lahey ................ | G06F 17/30011 |
| 6,189,051 | B1 * | 2/2001 | Oh ........................ | G06F 3/0605 709/203 |
| 6,335,795 | B1 * | 1/2002 | Neuhard ............... | G06F 3/1205 358/1.15 |
| 6,529,286 | B1 * | 3/2003 | King ...................... | G06K 15/00 358/1.1 |
| 6,532,537 | B1 * | 3/2003 | Chen .................... | G06F 9/4416 711/100 |
| 7,006,242 | B2 * | 2/2006 | Smith, II ................. | H04L 29/06 358/1.15 |
| 7,099,031 | B2 * | 8/2006 | Ogura .................... | G06F 3/1205 358/1.14 |
| 7,370,074 | B2 * | 5/2008 | Alexander ............. | G05B 15/02 700/83 |
| 7,619,758 | B2 * | 11/2009 | Kujirai .................. | G06F 3/1204 358/1.13 |
| 7,895,361 | B2 * | 2/2011 | Nishio ................ | H04L 12/2803 709/246 |
| 8,166,515 | B2 * | 4/2012 | Hill ...................... | G06F 21/6218 726/1 |
| 2002/0174206 | A1 * | 11/2002 | Moyer .................. | G06F 9/4411 709/221 |
| 2004/0184074 | A2 * | 9/2004 | Leiman et al. ............... | 358/1.15 |
| 2004/0233881 | A1 * | 11/2004 | Kang ...................... | H04L 45/00 370/338 |
| 2006/0044586 | A1 * | 3/2006 | Kujirai .................. | G06F 3/1204 358/1.13 |
| 2006/0114509 | A1 * | 6/2006 | Itaki .................... | H04N 1/00347 358/1.15 |
| 2006/0184510 | A1 * | 8/2006 | Nishio ................ | H04L 12/2803 |

(Continued)

OTHER PUBLICATIONS

Universal Serial Bus, Wikipedia, Jul. 23, 2012, pp. 1-33.*

(Continued)

*Primary Examiner* — Backhean Tiv
(74) *Attorney, Agent, or Firm* — Farjami & Farjami LLP (57) ABSTRACT

There is provided a system and method for extending media device functions using a peripheral control interface. There is provided a media device for controlling a peripheral device where the media device provides a plurality of native functions. The media device comprises a network interface and a processor configured to establish a connection with a network using the network interface, execute a media application to discover a route to a server through the connection, obtain via the route a peripheral control interface for providing a mediation service associated with the peripheral device, and send a command to the server using the route for controlling the peripheral device using the peripheral control interface, which causes the peripheral device to execute a function outside of the plurality of native functions provided by the media device.

20 Claims, 4 Drawing Sheets

(56) References Cited

U.S. PATENT DOCUMENTS

| | | | | |
|---|---|---|---|---|
| 2006/0193006 | A1* | 8/2006 | Lawrence | G06F 3/1206 358/1.16 |
| 2006/0268337 | A1* | 11/2006 | Leiman et al. | 358/1.15 |
| 2006/0287962 | A1* | 12/2006 | Oosawa | G06F 21/608 705/59 |
| 2007/0046990 | A1* | 3/2007 | Huang | G06F 9/4411 358/1.15 |
| 2008/0021952 | A1* | 1/2008 | Molinie | H04L 12/18 709/203 |
| 2009/0168091 | A1* | 7/2009 | Fu | G06F 3/1204 358/1.15 |
| 2009/0285128 | A1* | 11/2009 | Swan | H04L 41/12 370/256 |
| 2009/0327498 | A1* | 12/2009 | Sampath | H04L 63/20 709/228 |
| 2010/0235741 | A1* | 9/2010 | Newman | G06F 9/542 715/716 |
| 2010/0238488 | A1* | 9/2010 | Alaghband | G06F 3/1222 358/1.15 |
| 2010/0271654 | A1* | 10/2010 | Prestenback | H04L 67/16 358/1.15 |

OTHER PUBLICATIONS

Blu-ray Disc, Wikipedia, Jul. 23, 2012, pp. 1-30.*

Bluetooth, Wikipedia, Jul. 23, 2012, pp. 1-23.*

* cited by examiner

SYSTEM AND METHOD FOR PROVIDING A PERIPHERAL CONTROL INTERFACE FOR EXTENDING MEDIA DEVICE FUNCTIONS

BACKGROUND OF THE INVENTION

1. Field of the Invention

The present invention relates generally to media playback devices. More particularly, the present invention relates to using media playback devices with peripheral control interfaces.

2. Background Art

Media devices such as DVD players, Blu-ray players, set-top boxes, media streaming boxes, and other devices have established a ubiquitous presence in the modern household. By providing entertainment functionality accessible through a simple interface such as a remote control and an on-screen display, these media devices are often much easier and more convenient to use than a more generalized device such as a personal computer. Additionally, by including only the necessary hardware for media functionality, media devices can adopt energy efficient, slim and unobtrusive form factors that may be prohibitively expensive for more generalized devices.

However, precisely because media devices tend to support only a limited range of functionality such as media playback, peripheral device support may be severely restricted. For example, input reception to a media device may be restricted to signals from an infrared remote control. However, a user may wish to use a USB mouse, a wireless keyboard, a game controller using the Bluetooth protocol, or another input device that is not directly supported through native functionality of the media device.

In a similar manner, output may be limited to playback of video on a display and audio on an audio device directly connected to the media device. However, the user may also want to use certain peripherals, such as Bluetooth enabled speakers for audio output and a USB printer to print still images from a movie. Unless the media device has natively integrated Bluetooth audio and USB printing support, the user cannot use the media device with the desired peripherals. Given that there may be a wide range of different peripherals that the user may want to use, providing support for all possible peripherals natively on a media device may prove to be costly and impractical due to additional development and hardware costs.

Accordingly, there is a need to overcome the drawbacks and deficiencies in the art by finding a way to support a wide variety of peripheral devices on a media device without incurring the costs and drawbacks of natively implementing peripheral support.

SUMMARY OF THE INVENTION

There are provided systems and methods for extending media device functions using a peripheral control interface, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for extending media device functions using a peripheral control interface. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
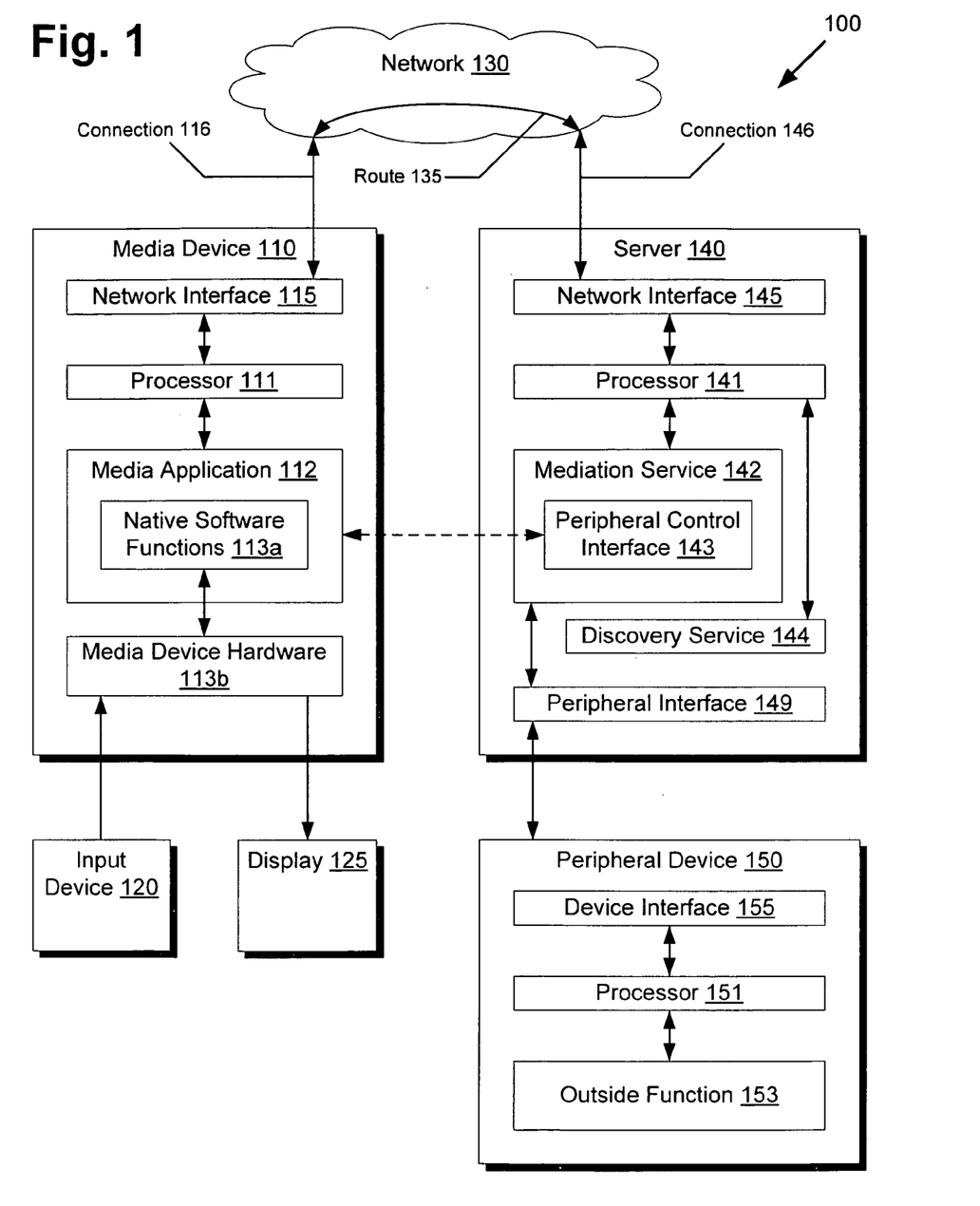
FIG. 1 presents a block diagram of a system for extending media device functions using a peripheral control interface, according to one embodiment of the present invention.

FIG. 1 presents a block diagram of a system for extending media device functions using a peripheral control interface, according to one embodiment of the present invention. Environment 100 of FIG. 1 includes media device 110, input device 120, display 125, network 130, server 140, and peripheral device 150. Media device 110 includes processor 111, media application 112 including native software functions 113a, media device hardware 113b, and network interface 115. Network 130 includes route 135. Server 140 includes processor 141, mediation service 142 including peripheral control interface 143, discovery service 144, network interface 145, and peripheral interface 149. Peripheral device 150 includes processor 151, outside function 153, and device interface 155.

Media device 110 may comprise, for example, a Blu-ray player, a DVD-Video player, a set-top box, a media streaming box, a digital video recorder, or another device providing media functions. At a minimum, by executing media application 112, processor 111 of media device 110 may support reading user input from input device 120, sending video output to display 125, and exchanging data communications through network 130. The functions of media device 110 may also be defined to implement a specification such as Blu-ray Video Disc Profile 2.0. In this case, a plurality of native functions necessary to implement Blu-ray video playback according to the features of Profile 2.0 may be supported by native software functions 113a and media device hardware 113b.

For example, to support reading user input from input device 120, which might comprise an infrared remote control, media device hardware 113b may include an onboard infrared receiver, and native software functions 113a may include functions for decoding and interpreting encoded infrared signals. To support video playback from compressed video streams stored on media discs or streamed from network 130, native software functions 113a may include software routines for video decompression. Alternatively, media device hardware 113b may include specialized video decoding hardware. Once the video streams are decoded, a video output chip in media device hardware 113b may send the decoded video signal via the High-Definition Multimedia Interface (HDMI) to display 125, which might comprise a High Definition Television (HDTV).

To support data communications through network 130, network interface 115 may support Transmission Control Protocol/Internet Protocol (TCP/IP), connection 116 may comprise a wired Ethernet or a wireless Wi-Fi connection, and network 130 may comprise a local area network (LAN) or a larger network such as the Internet. Network interface 115 may be implemented using a network interface device such as an Ethernet network adaptor or a Wi-Fi network adaptor that establishes connection 116 to network 130. A wireless router, a network hub, or a network switch may provide a LAN for network 130. An uplink to the Internet by cable modem or Digital Subscriber Line (DSL) modem may also be provided for Internet access.

Media device 110 may also support any additional functionality by adding additional software functions in native software functions 113a and additional hardware components in media device hardware 113b. However, given that media device 110 may be a fairly specialized device streamlined for media playback and related tasks, native software functions 113a and media device hardware 113b may be composed similar to configurations described above without many other additions. In this manner, manufacturing costs and complexity can be reduced. This in turn can allow media device designs to fit in attractive form factors, reduce total purchase costs for consumers, and facilitate development of organized and user-friendly interfaces.

Turning to server 140, server 140 may comprise, for example, a dedicated server hosted on the Internet, or may alternatively comprise a personal computer within the household of a user of media device 110. If server 140 is hosted on the Internet as a dedicated server, then server maintenance staff may monitor server 140 to ensure a high uptime for mediation service 142 and discovery service 144. Alternatively, if server 140 comprises a desktop computer or a notebook computer on a LAN, the user may install server services to provide mediation service 142 and discovery service 144. A local server may be preferable in some situations to an Internet hosted server, as maintenance, bandwidth, and scaling issues of Internet hosted servers can be eliminated with a high speed, low latency local server. Moreover, if the user leaves server 140 on for extended periods of time, which may become more common behavior as energy efficiency for personal computers improve, server 140 may reach an uptime similar to a dedicated server on the Internet.

The services hosted by server 140 may be downloaded from the Internet through network 130, bundled as a software installation of a packaged media set for media device 110 or peripheral device 150, or provided separately and independently. Once the user decides to install these services, processor 141 may be configured to execute mediation service 142 and discovery service 144 automatically as startup or boot-time services. In this manner, mediation service 142 and discovery service 144 may be available for a majority of the time while server 140 is actively powered on.

Network interface 145, which may comprise a TCP/IP Ethernet adaptor device or Wi-Fi adaptor device similar to network interface 115, may establish connection 146 to network 130. Once connection 146 is available, discovery service 144 may advertise the existence of server 140 over connection 146 by broadcasting route 135 to media device 110. This may be done by sending route 135 explicitly as a series of network traversals, or indirectly by simply providing a destination network identifier such as an Internet Protocol (IP) address of server 140. If route 135 is provided indirectly, components of network 130 such as network routers and switches may generate route 135 by deriving a path from media device 110 to the destination network identifier pointing to server 140. As previously discussed, since network 130 might either comprise a LAN or a wider network such as the Internet, route 135 may in turn traverse only a LAN subnet of network 130, or may traverse a broader route through the Internet.

Processor 141 may also execute mediation service 142 to provide communication with peripheral device 150. Processor 141 may furthermore provide peripheral control interface 143 as obtainable by media device 110 through route 135 to server 140 for using mediation service 142. Media application 112 can then send a command to server 140 using route 135 to server 140 for controlling peripheral device 150 using the obtained peripheral control interface 143. Processor 141 can receive the command for mediation service 142 to convert into a proper format for peripheral interface 149, which may then be sent to peripheral device 150 to be read by device interface 155. Processor 151 of peripheral device 150 may then interpret the converted command to cause an execution of outside function 153, where outside function 153 is excluded from the native functions of media device 110 as specified by native software functions 113a and media device hardware 113b. In this manner, mediation service 142 acts as a proxy or bridge for media application 112, exposing peripheral control interface 143, converting incoming commands to a proper format based on a specification of peripheral interface 149, and sending the converted commands to peripheral device 150 to execute a function that media device 110 cannot accomplish in isolation.

Thus, to control peripheral device 150, media application 112 does not need to have specific knowledge of peripheral interface 149 to address peripheral device 150. By abstracting a simplified high-level interface within peripheral control interface 143, and by allowing mediation service 142 to handle any necessary data format conversions and other details, media application 112 can quickly take advantage of any additional functionality provided by outside function 153 of peripheral device 150. In this manner, native functions of media device 110 can be easily extended to support communications with additional peripheral devices to provide new functionality without needing to change any aspect of media device 110, allowing media content industries to leverage existing media device install bases and avoiding the need for messy transitions to proprietary media devices just to support peripheral device 150 or other peripheral devices. Only media application 112 needs to be written to take advantage of outside function 153, which may be readily achieved by updating media application 112 over the Internet by network 130, or by providing prepared media discs with media application 112 specifically written to utilize peripheral device 150 or other peripheral devices.

Although environment 100 of FIG. 1 only depicts one media device 110, one server 140, and one peripheral device 150 for purposes of clarity, alternative embodiments may include multiple media devices, multiple servers, and multiple peripheral devices addressable via network 130. For example, to improve uptime, media device 110 may fall back to an Internet server if a LAN server is unavailable, and multiple Internet servers may exist for redundancy, load balancing, and greater uptime. A household may also have several different media devices, for example a media device in a living room, and a media device for each bedroom, all connected to network 130 through Wi-Fi connections. Similarly, each server may also address multiple peripheral devices, and multiple servers might address the same peripheral device if environmental factors such as physical distances and protocol specifications allow for concurrent communications.

Figure 2:
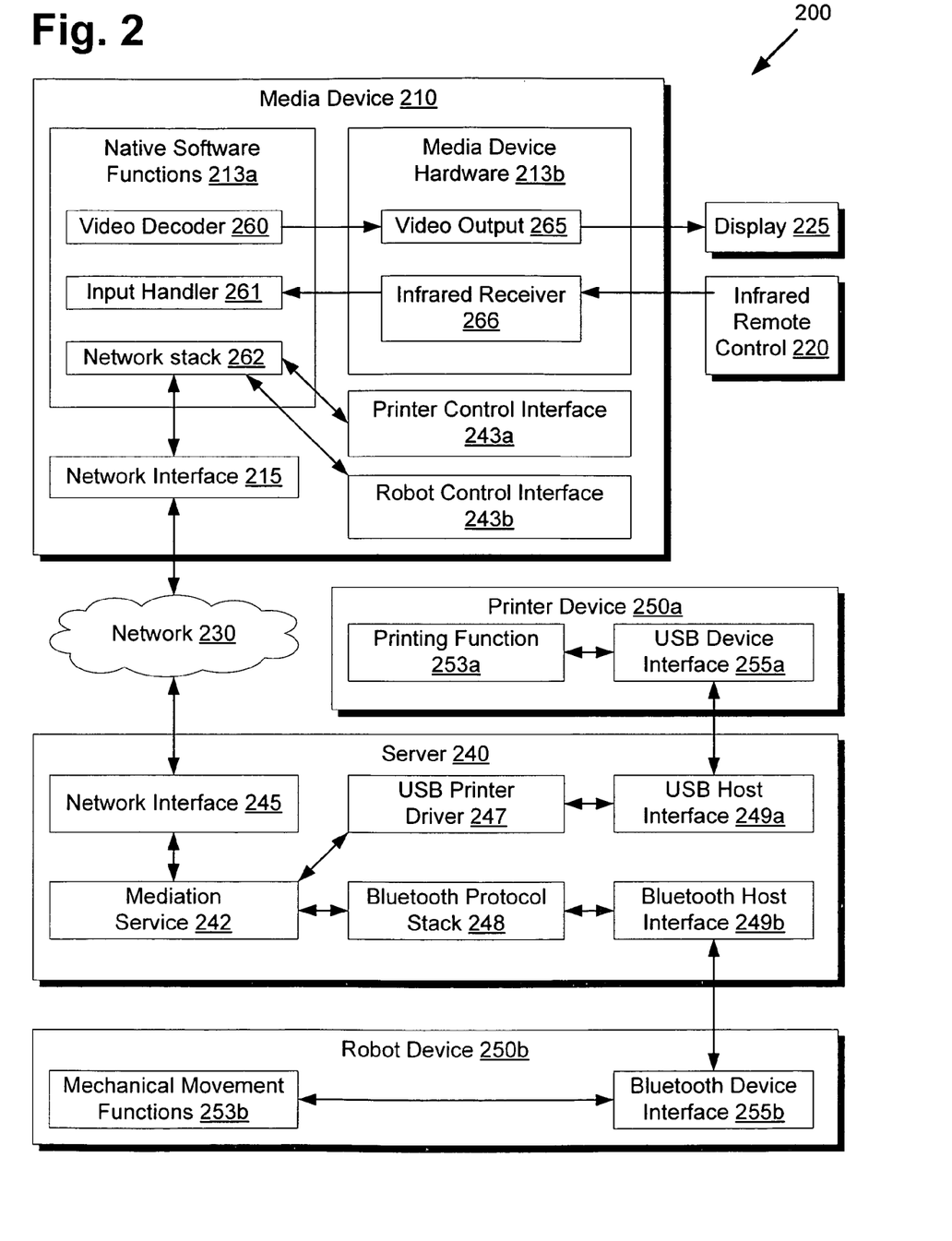
FIG. 2 presents a block diagram of an exemplary system for extending media device functions using multiple peripheral control interfaces, according to one embodiment of the present invention.

FIG. 2 presents a block diagram of an exemplary system for extending media device functions using multiple peripheral control interfaces, according to one embodiment of the present invention. Environment 200 of FIG. 2 includes media device 210, infrared remote control 220, display 225, network 230, server 240, printer device 250a, and robot device 250b. Media device 210 includes native software functions 213a, media device hardware 213b, network interface 215, printer control interface 243a, and robot control interface 243b. Server 240 includes mediation service 242, network interface 245, USB printer driver 247, Bluetooth protocol stack 248, USB host interface 249a, and Bluetooth host interface 249b. Printer device 250a includes printing function 253a and USB device interface 255a. Robot device 250b includes mechanical movement functions 253b and Bluetooth device interface 255b. With regards to FIG. 2, it should be noted that media device 210 corresponds to media device 110 from FIG. 1, that infrared remote control 220 corresponds to input device 120, that display 225 corresponds to display 125, that network 230 corresponds to network 130, that server 240 corresponds to server 140, that printer device 250a corresponds to peripheral device 150, and that robot device 250b also corresponds to peripheral device 150.

Environment 200 of FIG. 2 presents a detailed view of some of the native functionality that may be provided by media device 210. As shown by native software functions 213a and media device hardware 213b, the functionality is similar to the capabilities described above in FIG. 1. Video decoder 260 may decode compressed video files to be sent to video output 265 for final viewing on display 225. Input handler 261 may decode encoded infrared signals sent by infrared remote control 220 and forwarded by infrared receiver 266. Network stack 262 may implement a TCP/IP stack for using network interface 215.

As shown in media device 210, media device 210 may have already previously obtained both printer control interface 243a and robot control interface 243b from mediation service 242, where a processor of media device 210 may maintain a plurality of available peripheral control interfaces to peripheral devices. Alternatively, media device 210 may obtain peripheral interfaces only on demand, or may select only a particular peripheral interface from available peripheral interfaces instead of all available peripheral interfaces presented by server 240. A media application, omitted from FIG. 2, may execute to utilize printer control interface 243a and robot control interface 243b, sending commands through network stack 262, network interface 215, network 230, mediation service 242, and eventually to printer device 250a using the USB protocol or robot device 250b using the Bluetooth protocol. USB and Bluetooth devices are selected as specific example peripheral devices for FIG. 2, but alternative communications protocols for peripheral devices may also be used.

Server 240 supports communications with multiple peripheral devices by providing multiple peripheral control interfaces. Server 240 can address printer device 250a using USB printer driver 247 and USB host interface 249a. Server 240 can also address robot device 250b using Bluetooth protocol stack 248 and Bluetooth host interface 249b. Mediation service 242 can receive commands using both printer control interface 243a and robot control interface 243b, convert them into the proper data formats, and route them to the correct peripheral device accordingly. Thus, mediation service 242 can generate USB communications to execute printing function 253a in response, or generate Bluetooth communications to execute mechanical movement functions 253b in response.

For example, media device 210, having obtained printer control interface 243a and robot control interface 243b, may select printer control interface 243a for sending a command to print text content. However, printing function 253a of printer device 250 may require content to be provided as a bitmap image. In this case, mediation service 242 might transparently convert the text content into a bitmap image, thus allowing media device 210 to largely ignore low-level implementation details such as the bitmap only limitation. Similarly, since server 240 provides USB printer driver 247 and USB host interface 249a, media device 210 does not need to have any special knowledge about the USB protocol, but only needs to format commands as specified by printer control interface 243a.

For example, printer control interface 243a may provide only a few simple well-defined commands for printing text documents or images, relying on mediation service 242 for detailed data formatting and conversion. Mediation service 242 may, for example, provide optimal image settings such as colorspace conversion from RGB to CMYK, rotation for landscape or portrait orientations to fill the paper, image cropping and zoom, setting paper size and margins, and handling other details to hide and abstract peripheral complexity from media device 210. In this manner, native functions of media device 210 are extended to provide easily interfaced USB printing functionality without necessitating any detailed knowledge of printer drivers or USB protocols. Once printing function 253a receives a properly formatted bitmap image via USB device interface 255a, a printout of the image content based on the optimal image settings set by mediation service 242 can begin to print on paper.

In a similar manner, robot control interface 243b may provide only a few specific commands for controlling robot device 250b in a high-level manner. For example, robot control interface 243b may expose a single "dance" function with two possible speed settings. Mediation service 242 may convert the "dance" function into a sequence of movements, when executed together, give the appearance that robot device 250b is dancing. Mediation service 242 may also vary the speed of the "dance" function using a specified speed setting. Mediation service 242 can then forward these movements over Bluetooth protocol stack 248 and Bluetooth host interface 249b to be received by Bluetooth device interface 255b at robot device 250b for executing mechanical movement functions 253b according to the sequence of movements. Thus, native functions of media device 210 are extended to trigger a dance routine from robot device 250b, even if media device 210 lacks a Bluetooth interface, and even if media device 210 does not have specific data on a dance routine.

Moreover, server 240 may act as the peripheral device to be commanded by media device 210, rather than using an attached peripheral device. For example, server 240 may comprise a locally accessible device such as the user's personal computer, which may be executing a client application such as a web browser. In this manner, server 240 acts not only as a server system for network message passing, discovery, and mediation services, but also as a client workstation for the user. Media device 210 might be provided with a web browser control interface to control the actions of the web browser running as a client application on server 240. For example, during playback of the movie, media device 210 may send a command to server 240 to update the web browser to point to the official website for the movie, allowing the user to enjoy both the movie showing on display 225 and additional movie resources shown on the official website at server 240. Thus, the actions for peripheral devices sent by media device 210 may also be directed for the server to implement, and may affect software user applications instead of executing a hardware function.

As a result, media device 210, which previously could only output video to display 225, interpret simple user input from infrared remote control 220, and communicate with network 230, is now extended to offer a variety of outside functions beyond the scope of native software functions 213a and media device hardware 213b. Media device 210 can now, without detailed knowledge of underlying communications protocols, print documents or images at printer device 250a, or trigger a dance routine from Bluetooth accessible robot device 250b. Media device 210 can also rely on mediation service 242 to transform and convert data as necessary, allowing easy integration of printer control interface 243a and robot control interface 243b into potential media applications for media device 210.

Figure 3A:
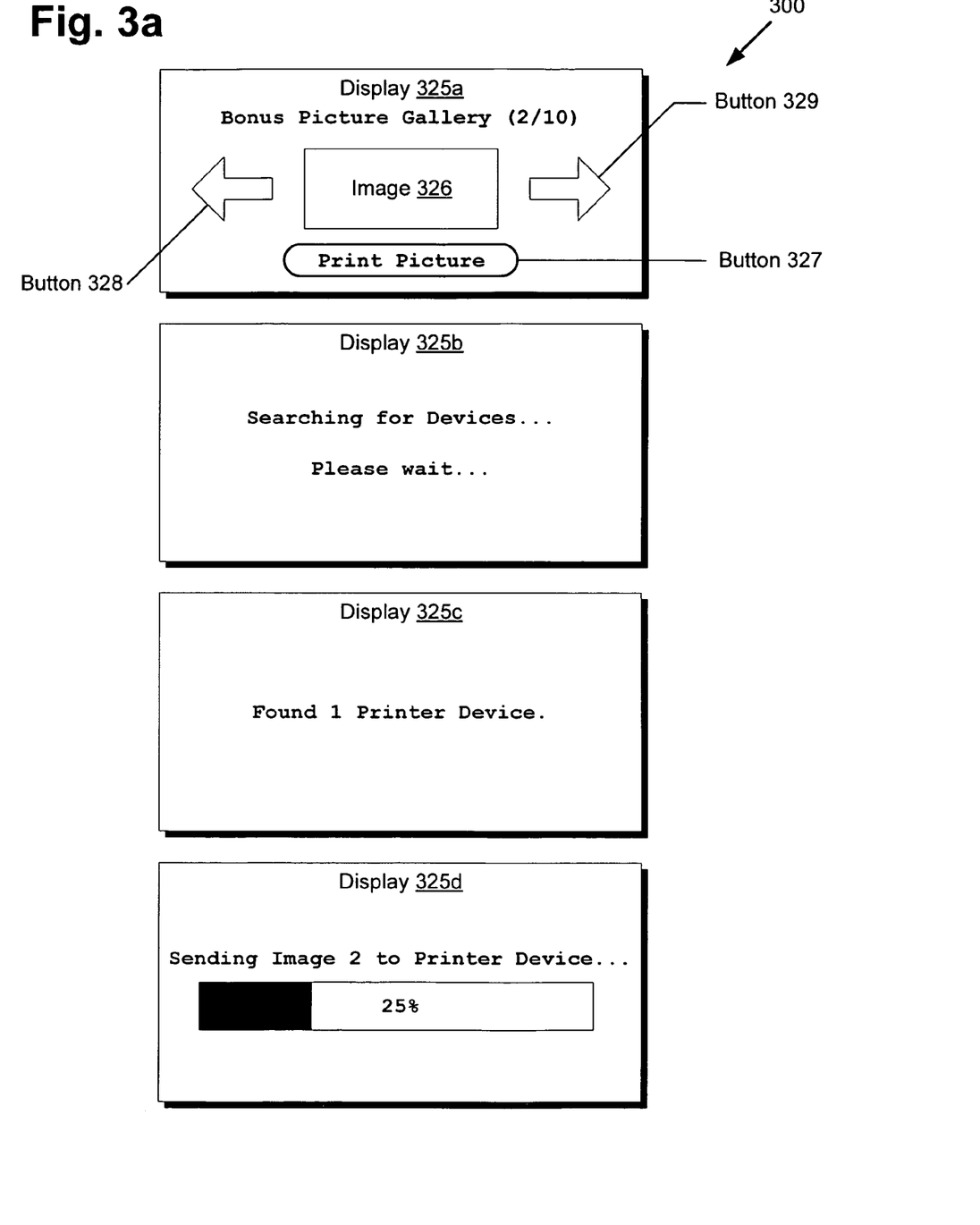
FIG. 3 presents an exemplary user interface for media devices using a peripheral control interface, according to one embodiment of the present invention.

FIG. 3 presents an exemplary user interface for media devices using a peripheral control interface, according to one embodiment of the present invention. Interface diagram 300 includes displays 325a-325d. Display 325a includes buttons 327-329. With regards to FIG. 3, it should be noted that displays 325a-325d correspond to display 225 from FIG. 2.

Display 325a shows a user interface of an example media application that may be presented to a user. For example, a Blu-ray disc may include as extra features a bonus image picture gallery of content related to the feature film contained on the Blu-ray disc. A user might use a remote control to select buttons 328-329 for navigating to a desired picture, where image 326 is updated to reflect the currently selected picture. Once the user finds a picture of interest, a printed copy of the picture might be desired. Thus, the user might initiate button 327 using the remote control.

After button 327 is initiated, display 325a may transition to display 325b, indicating that a media device outputting to display 325b is currently searching for available peripheral devices. Once a network search is finished, whether through LAN or Internet, display 325b may transition to display 325c, indicating the presence of one printer device. Since only one printer device is found, display 325c may automatically transition to display 325d, but if multiple peripheral devices were found, then display 325c may transition to an intermediary prompt where the user may select a desired printer. Once a printer is selected, a message similar to display 325d may appear, where the selected image, or image 2 corresponding to image 326, is sent to the selected printer for printing to paper while a progress bar is updated on the display.

In this manner, by utilizing an input device such as a remote control to send commands through a network via a media device, a user is enabled to interact with peripherals for which a media device may lack direct native support. Moreover, by using the peripheral interface abstraction as discussed above, media applications can be rapidly developed to take advantage of many different peripherals, extending functions of the media device to provide endless possibilities through additional functionality, providing value added services for users.

Figure 4:
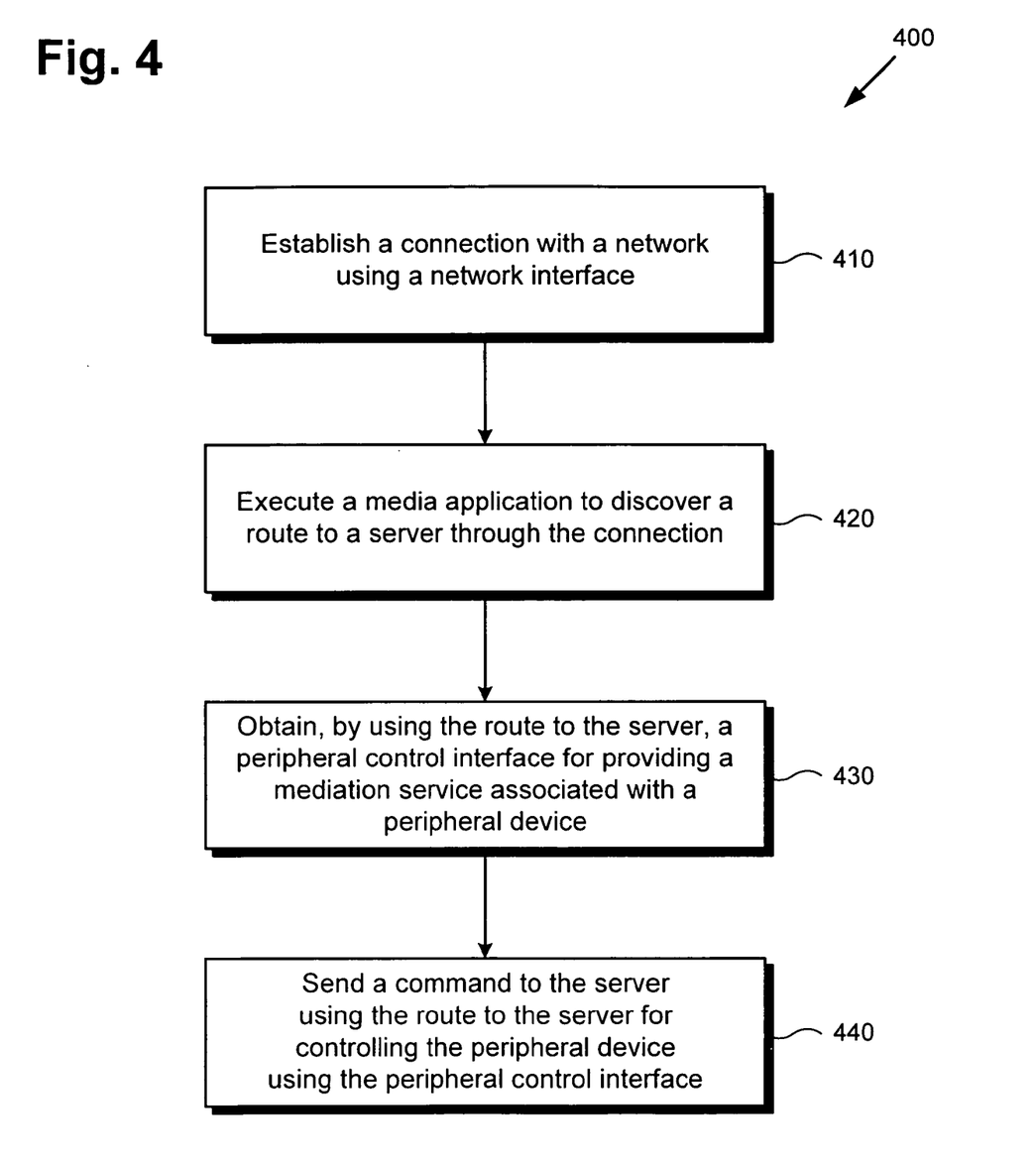
FIG. 4 shows a flowchart describing the steps, according to one embodiment of the present invention, by which a media device can control a peripheral device.

FIG. 4 shows a flowchart describing the steps, according to one embodiment of the present invention, by which a media device can control a peripheral device. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and environment 100 of FIG. 1, step 410 of flowchart 400 comprises processor 111 of media device 110 establishing connection 116 with network 130 using network interface 115. As previously discussed, network interface 115 may be supported by various network interface devices such as an Ethernet or Wi-Fi network adaptor. Various networking hardware such as a wireless router or broadband modems may further support the infrastructure of network 130.

Referring to step 420 of flowchart 400 in FIG. 4 and environment 100 of FIG. 1, step 420 of flowchart 400 comprises processor 111 of media device 110 executing media application 112 to discover route 135 to server 140 through connection 116 established in step 410. As previously discussed, server 140 may be broadcasting a destination address or route 135 itself using discovery service 144 and connection 146, which can be discovered by media device 110 via connection 116. If media device 110 merely receives a destination address, then network 130 may use route 135 by deriving a path using the destination address.

Referring to step 430 of flowchart 400 in FIG. 4 and environment 100 of FIG. 1, step 430 of flowchart 400 comprises processor 111 of media device 110 obtaining, by using route 135 to server 140 as discovered in step 420, peripheral control interface 143 for providing mediation service 142 associated with peripheral device 150. As previously discussed, peripheral control interface 143 may provide to media device 110 a high-level interface for controlling peripheral device 150, allowing rapid development of media application 112 by ignoring low-level details handled by mediation service 142 and other elements of server 140, such as peripheral interface 149. These low-level details might involve data formatting, data conversions, protocol implementations, and other details that may be less important for media device 110 to have direct control over.

Referring to step 440 of flowchart 400 in FIG. 4 and environment 100 of FIG. 1, step 440 of flowchart 400 comprises processor 111 of media device 110 sending a command using route 135 to server 140 for controlling peripheral device 150 using peripheral control interface 143 obtained from step 430. Sending the command causes mediation service 142 to convert the command for proper formatting if necessary, and to forward the converted command via peripheral interface 149 to be read by device interface 155 of peripheral device 150. Processor 151 of peripheral device 150 may then execute outside function 153, where outside function 153 is outside of functions provided by native software functions 113a and media device hardware 113b.

In this manner, native functions of media device 110 are extended to access and control functions not normally available through native functions on media device 110 alone, as previously discussed. By avoiding detailed modification of media device 110 and providing streamlined and easy to integrate peripheral control interface 143 for rapid development of media application 112, peripheral device 150 can be quickly and readily supported by existing media devices, providing new and exciting functionality and experiences with a minimum of investment and effort required from users.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A media device for controlling a peripheral device, the media device further providing a plurality of native functions, the media device comprising:
    a network interface; and
    a processor configured to:
        establish a connection with a network using the network interface;
        execute a media application to discover a route to a server through the connection;
        receive, by using the route to the server, a peripheral control interface from the server, the peripheral control interface providing a mediation service associated with the peripheral device and used to control the peripheral device, wherein the peripheral device is not natively supported by the media device; and
        send a command to the server using the route to the server for controlling the peripheral device using the peripheral control interface and, causing the server to convert the command to a data format of the peripheral device, and causing the peripheral device to execute a function outside of the plurality of native functions provided by the media device, thereby extending the plurality of native functions of the media device.

2. The media device of claim 1, wherein the processor is configured to execute the media application to discover the route to the server wherein the route traverses only a local area network (LAN) subnet of the network.

3. The media device of claim 1, wherein the processor is configured to execute the media application to discover the route to the server wherein the route traverses the Internet.

4. The media device of claim 1, wherein the plurality of native functions are configured to include reading user input from an input device, sending video output to a display, and exchanging data communications using the connection.

5. The media device of claim 1, wherein the plurality of native functions are configured to include functions supporting an implementation of Blu-ray Video Disc Profile 2.0.

6. The media device of claim 1, wherein the peripheral device comprises a printer, and wherein the function outside of the plurality of native functions comprise printing content to paper.

7. The media device of claim 1, wherein sending the command further causes the server to forward the command in the data format to the peripheral device.

8. The media device of claim 1, wherein the peripheral device is the server, and wherein the function outside of the plurality of native functions comprises controlling a user application executing on the server.

9. The media device of claim 1 wherein prior to obtaining the peripheral control interface, the processor is further configured to select the peripheral control interface from a plurality of peripheral control interfaces presented by the server.

10. A method for use by a media device for controlling a peripheral device, the media device further providing a plurality of native functions, the method comprising:
    establishing a connection with a network using a network interface;
    executing a media application to discover a route to a server through the connection;
    receiving, by using the route to the server, a peripheral control interface from the server, the peripheral control interface providing a mediation service associated with the peripheral device and used to control the peripheral device, wherein the peripheral device is not natively supported by the media device; and
    sending a command to the server using the route to the server for controlling the peripheral device using the peripheral control interface and, causing the server to convert the command to a data format of the peripheral device, and causing the peripheral device to execute a function outside of the plurality of native functions provided by the media device, thereby extending the plurality of native functions of the media device.

11. The method of claim 10, further comprising prior to obtaining the peripheral control interface, selecting the peripheral control interface from a plurality of peripheral control interfaces presented by the server.

12. The method of claim 10, wherein the executing the media application discovers the route to the server wherein the route traverses only a local area network (LAN) subset of the network.

13. The method of claim 10, wherein the executing of the media application discovers the route to the server wherein the route traverses the Internet.

14. The method of claim 10, wherein the sending of the command to the server causes the peripheral device to execute the function comprising printing content to a paper, and wherein the peripheral device comprises a printer.

15. The method of claim 10, wherein the sending of the command to the server using the peripheral control interface further causes the server to forward the command in the data format to the peripheral device.

16. The method of claim 10, wherein the sending of the command to the server using the peripheral control interface further causes the mediation service to generate Universal Serial Bus (USB) communications and the peripheral device to execute the function in response to the USB communications.

17. A server for use by a media device to control a peripheral device in communication with the server, the media device having a plurality of native functions, the server comprising:
    a network interface; and
    a processor configured to:
        establish a connection with a network using the network interface;
        execute a discovery service to broadcast a route to the server through the connection for use by the media device;
        execute a mediation service for providing a communication between the media device and the peripheral device;
        transmit a peripheral control interface to the media device through the route to the server using the mediation device, wherein the peripheral control interface allows the media device to control the peripheral device, and wherein the peripheral device is not natively supported by the media device;

receive a command from the media device through the route to the server for controlling the peripheral device using the peripheral control interface;

convert the command to a data format of the peripheral device;

interpret the command using the mediation service for controlling the peripheral device using the peripheral control interface to execute a function on the peripheral device outside of the plurality of native functions provided by the media device, thereby extending the plurality of native functions of the media device.

18. The server of claim 17, wherein the processor is configured to execute the discovery service to broadcast the route to the server wherein the route traverses only a local area network (LAN) subnet of the network.

19. The server of claim 17, wherein the processor is configured to execute the discovery service to broadcast the route to the server wherein the route traverses the Internet.

20. The server of claim 17, wherein the processor is configured to provide the peripheral control interface from a plurality of peripheral control interfaces accessible by the media device through the route to the server using the mediation service, wherein the mediation service is further configured to provide communication between the media device and a plurality of peripheral devices including the peripheral device.

* * * * *

UNITED STATES PATENT AND TRADEMARK OFFICE
CERTIFICATE OF CORRECTION

PATENT NO.       : 9,247,007 B2                        Page 1 of 1
APPLICATION NO.  : 12/386936
DATED            : January 26, 2016
INVENTOR(S)      : Prestenback et al.

It is certified that error appears in the above-identified patent and that said Letters Patent is hereby corrected as shown below:

In the claims,

Column 10, line 29, "subset" should be changed to --subnet--

Signed and Sealed this
Nineteenth Day of April, 2016

Michelle K. Lee
*Director of the United States Patent and Trademark Office*